UNITED STATES PATENT OFFICE.

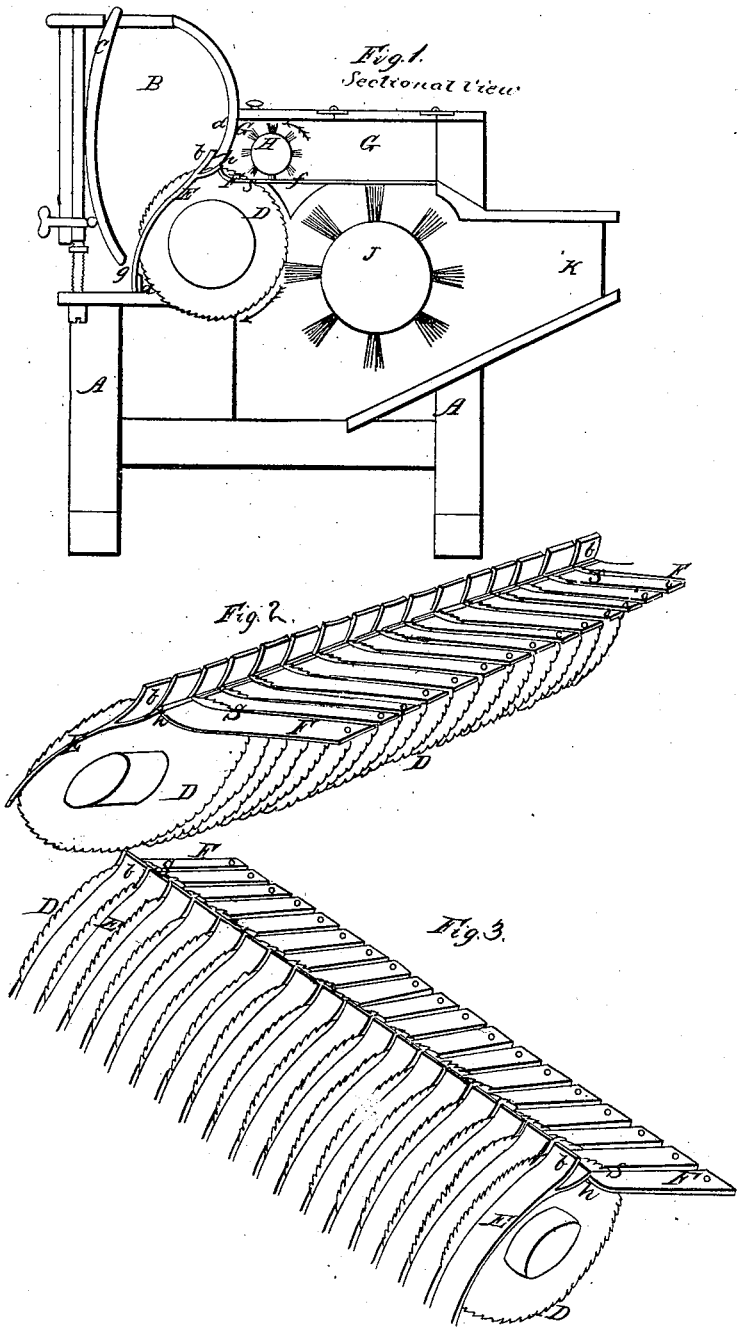
J. Du Bois.
Cotton Gin.
N° 6,998. Patented Jan. 8, 1850.

JOHN DU BOIS, OF GREENSBOROUGH, ALABAMA.

IMPROVEMENT IN COTTON-GINS.

Specification forming part of Letters Patent No. 6,998, dated January 8, 1850.

*To all whom it may concern:*

Be it known that I, JOHN DU BOIS, of Greensborough, in the county of Greene and State of Alabama, have invented a new and useful Improvement on the Cotton-Gin; and I hereby do declare that the following is a full, clear, and exact description, reference being had to the accompanying drawings, forming a part of this specification, in which—

Figure 1 is a vertical section showing the inside of the machine. Figure 2 is a perspective view showing the saws projecting through the spaces between the back ribs. Fig. 3 is a front perspective view of the saws and the ribs.

The same letters of reference indicate like parts on all the figures.

The nature of my invention consists in providing an auxiliary set of ribs, between which the saws pass twice after passing through the ribs in the roll-box, to separate motes, &c., from the cotton in a separate chamber from that in which the seeds are separated from the cotton.

To enable others skilled in the art to make and use my invention, I will proceed to describe its construction and operation.

The machine is nearly built in all respects like the common cotton-gin, with the exception of the auxiliary set of ribs to remove the motes, and a separate chamber to receive them, from which they are removed by a revolving brush.

A is the frame, built in any of the known ways.

B is the hopper or roll box, into which the uncleaned cotton is fed to the saws. The quantity of cotton is regulated by the swinging board C.

D are the saws. They are set and revolve in the usual way.

E E are a series of iron ribs. They are secured in any suitable way at the lower end to a transverse beam, *a;* they extend upward with outer projections, *b b*, which are braced nearly against the back board, *d*, of the roll-box, and then they extend back into the mote-chamber G. I will term the ribs from the projections *b* "the back ribs," although they are formed in one piece with the front ribs, E. The back ribs, F, are formed each with a horn, *h*, behind which they curve downward and are secured by screws or otherwise to the bed-plate *f* of the mote-chamber. The outside ribs, E, are convex in the roll-box, and the back ribs are concave in the mote-chamber behind the horn *h*. By the form of the back ribs, F, the saws pass between them twice during every revolution, once between them at the horn *h*, and again when passing down at S. The spaces through which the saws pass between the ribs E are a little larger than the spaces between the back ribs. The saws in passing between the ribs E drag in the cotton from the roll-box, and by this action (as is well known, separate the seed from the cotton, when the seeds fall down to the outside through the channel *g*. After the seeds are thus removed, a quantity of motes and other matter still adheres to the cotton, and for the purpose of removing such impurities I employ the back ribs, F, placed in a separate chamber, divided by the projections *b* from the roll-box. The saws in passing through the back ribs at the horn removes a quantity of motes, &c., and the cotton is still further cleaned from such impurities in passing again between the ribs at S, after which it is taken from the saws by the brush J, and pushed out into the cotton-room through the spout K. The brush H removes the motes backward, and thus prevents them from accumulating and falling down between the ribs.

By the employment of the auxiliary ribs F in the manner described a most beautiful and clean staple of cotton is produced.

Common cotton-gins that are now in use may easily and at little expense be furnished with my improvement, which is of great benefit on that account.

Having thus described my invention, I claim—

The back ribs, F, in combination with the front ribs, E, they (the back ribs) being constructed with a horn or projection, *h*, each, behind which they curve downward, to allow the saws to pass twice between the ribs to remove the motes and other impurities, in the manner substantially as described.

JOHN DU BOIS.

Witnesses:
 JNO. G. HARVEY,
 W. T. HARRISON.